United States Patent
Ishii

(10) Patent No.: US 6,884,133 B2
(45) Date of Patent: Apr. 26, 2005

(54) CATALYZER ARRANGEMENT FOR OUTBOARD MOTOR

(75) Inventor: Yasushi Ishii, Shizuoka (JP)

(73) Assignee: Yamaha Marine Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 10/090,421

(22) Filed: Feb. 28, 2002

(65) Prior Publication Data

US 2002/0146947 A1 Oct. 10, 2002

Related U.S. Application Data

(63) Continuation-in-part of application No. 09/591,745, filed on Jun. 12, 2000, now Pat. No. 6,729,921.

(30) Foreign Application Priority Data

Feb. 28, 2001 (JP) ........................................ 2001-054501

(51) Int. Cl.[7] ........................ B63H 21/32; B63H 21/34; B63H 21/38
(52) U.S. Cl. .................................. 440/89 H; 440/89 R
(58) Field of Search ............................ 440/89 R, 89 H, 440/89 B, 89 C; 60/299, 302

(56) References Cited

U.S. PATENT DOCUMENTS

| | | |
|---|---|---|
| 4,452,194 A | 6/1984 | Watanabe |
| 4,735,046 A | 4/1988 | Iwai |
| 4,848,082 A | 7/1989 | Takahashi et al. |
| 4,900,282 A | 2/1990 | Takahashi et al. |
| 5,174,112 A | 12/1992 | Sougawa et al. |
| 5,239,825 A | 8/1993 | Shibata |
| 5,280,708 A | 1/1994 | Sougawa et al. |
| 5,324,217 A | 6/1994 | Mineo |
| 5,372,530 A | 12/1994 | Holtermann et al. |
| 5,378,180 A | 1/1995 | Nakayama et al. |
| 5,556,311 A | 9/1996 | Fujimoto |
| 5,702,276 A | 12/1997 | Nakase et al. |
| 5,743,774 A | 4/1998 | Adachi et al. |
| 5,822,985 A | 10/1998 | Yoshimura |
| 5,911,609 A | 6/1999 | Fujimoto et al. |
| 5,911,610 A | 6/1999 | Fujimoto |
| 6,041,591 A * | 3/2000 | Kaneko et al. ................ 60/274 |
| 6,053,785 A | 4/2000 | Kato et al. |
| 6,119,453 A * | 9/2000 | Motose et al. ................ 60/285 |
| 6,511,355 B1 * | 1/2003 | Woodward .................. 440/88 J |

FOREIGN PATENT DOCUMENTS

| | | |
|---|---|---|
| DE | 42 34 682 A1 | 6/1993 |
| JP | 04-260893 | 9/1992 |
| JP | 06-193441 | 7/1994 |
| JP | 07-189671 | 7/1995 |
| JP | 09-049424 | 2/1997 |
| JP | 2001-073750 | 3/2001 |

* cited by examiner

Primary Examiner—Ed Swinehart
(74) Attorney, Agent, or Firm—Knobbe, Martens, Olson & Bear LLP

(57) ABSTRACT

An outboard motor includes an engine that defines a first exhaust passage section. A housing unit is mounted on an associated watercraft and defines a second exhaust passage section. A support member is mounted on the housing unit and supports the engine above the housing unit. The support member defines third and fourth exhaust passage sections. The third exhaust passage section is wholly defined within the support member and communicates with the first exhaust passage section. The fourth exhaust passage section communicates with the second exhaust passage section. An exhaust unit is detachably coupled with the support member and defines fifth exhaust passage section that communicates with the third and forth exhaust passage sections. At least one catalyzer is disposed in the fifth exhaust passage section of the exhaust unit.

37 Claims, 10 Drawing Sheets

CATALYZER ARRANGEMENT FOR OUTBOARD MOTOR

PRIORITY INFORMATION

The present application is a continuation-in-part of application Ser. No. 09/591,745, filed Jun. 12, 2000 now U.S. Pat. No. 6,729,921. This application also is based on and claims priority to Japanese Patent Application No. 2001-054501, filed Feb. 28, 2001; the entire contents of these applications are hereby expressly incorporated by reference.

BACKGROUND OF THE INVENTION

1. Field of the Invention

This invention relates to a catalyzer arrangement, and more particularly to an improved catalyzer arrangement suitable to an outboard motor.

2. Description of Related Art

A typical outboard motor has an engine atop thereof for powering a propulsion device. A protective cowling surrounds the engine. The engine and protective cowling together define the power head of the outboard motor. A driveshaft housing depends from the power head for supporting a driveshaft that extends from a crankshaft of the engine. A lower unit depends from the driveshaft housing for carrying the propulsion device, such as, for example, a propeller that is driven by the driveshaft through a propulsion shaft. The engine is provided with an exhaust system to discharge exhaust gases from the outboard motor.

A typical exhaust system includes generally three exhaust passages. The first passage is either disposed within the engine or on the engine, and within the protective cowling, to lead the exhaust gases from the engine. The second passage is disposed within the driveshaft housing and the lower unit for guiding the exhaust gases to a third passage and for silencing exhaust noise by passing the exhaust gases through at least one expansion chamber. The third passage is defined within a hollow hub of the propeller and terminates at a discharge port formed at the end of the hub. Normally, an idle exhaust passage with an idle discharge port is additionally provided in the driveshaft housing at a location above the body of water that surrounds the outboard motor. The majority of the exhaust gases are discharged to the body of water through the discharge port of the propeller hub (i.e., through the third passage), while the idle exhaust gases are discharged to the atmosphere through the idle discharge port.

It is desirably for environmental concerns to remove hydrocarbons and the other environmentally-harmful combustion byproducts from exhaust gases. For at least this reason, the exhaust gases often pass through a catalyzer that is disposed within the exhaust system. The catalyzer includes components that chemically react with the exhaust gases in a manner that renders certain of the exhaust gas constituents substantially environmentally harmless. The larger the catalyzer, the greater the efficiency thereof. However, because the engine is surrounded by the protective cowling, space is at a premium and limited areas are available for positioning the catalyzer within the cowling. If the engine has multiple cylinder bores, properly positioning the catalyzer becomes more difficult. Moreover, if a large single catalyzer or small multiple catalyzers are used to treat exhaust gases coming from the respective cylinder bores, finding adequate space within the cramped confines of the cowling becomes very difficult.

In one arrangement, such as that disclosed by U.S. Pat. No. 5,239,825, a catalyzer arrangement for a multiple cylinder engine features a single catalyzer that is disposed in the first exhaust passage and sideward of the engine. Although the arrangement is compact, the catalyzer is somewhat bulky.

U.S. Pat. No. 5,378,180 discloses another arrangement in which a catalyzer is disposed also in the first exhaust passage but rearward of an engine. This type of arrangement, however, requires a large amount of space rearward of the engine. It is undesirable to expand the outboard motor rearward to provide a large enough space to contain the whole volume of the catalyzer and a catalyzer holding passage because such a construction would make handling of the outboard motor more difficult. Additionally, if the engine operates on a four-stroke combustion principle, a voluminous valve system is disposed in this otherwise available space.

U.S. Pat. No. 5,174,112 and U.S. Pat. No. 5,280,708 disclose further arrangements of catalyzers. The catalyzers in these patents are disposed in the second exhaust passages that are positioned within the driveshaft housing. Although a relatively large capacity is available with the catalyzer in this arrangement, the catalyzer is likely positioned proximate the water line. As is known, catalyzers can be fouled or shattered by contact with water. Accordingly, positioning the catalyzers proximate the water line is disadvantageous due to the possibility of water back flow through the exhaust system.

Another prior arrangement of the catalyzer positioned the catalyzer below and to the rear of the engine. This arrangement integrated the catalyzer with an exhaust guide member of the outboard motor. See, for example, U.S. Pat. No. 5,743,774. This prior arrangement, however, made it difficult to service the catalyzer. It also complicated the construction of the exhaust guide member. The exhaust guide member usually defines cooling jackets, as well as oil passages for outboard motors with a four-cycle engine. The exhaust guide member thus had to increase in size compared to prior designs in order to integrate the catalyzer while still providing space for the cooling and lubrication passages. The larger exhaust guide member, with its more complicated arrangement of exhaust, cooling and lubricant passages, tended to increase the production costs of the outboard motor.

SUMMARY OF THE INVENTION

An aspect of the present invention involves an improved catalyzer arrangement that eases maintenance of the catalyzer and does not complicate the construction of an exhaust guide member of the outboard motor. The present catalyzer arrangement, in a preferred embodiment, does not require relatively large changes to the configuration of the exhaust guide member, nor requires significant changes to the internal arrangement of lubricant and cooling water passages within the exhaust guide member.

In accordance with this aspect of the present invention, an outboard motor comprises an internal combustion engine, which has a first exhaust passage section, and a housing unit that is adapted to be mounted on an associated watercraft. The housing unit defines a second exhaust passage section. A support member is mounted on the housing unit to support the engine above the housing unit. The support member defines third and fourth exhaust passage sections. The third exhaust passage section is wholly defined within the support member and communicates with the first exhaust passage section. The fourth exhaust passage section communicates with the second exhaust passage section. An exhaust unit is detachably coupled with the support member and defines a fifth exhaust passage section communicating with the third and forth exhaust passage sections. At least one catalyzer is disposed in the fifth exhaust passage section of the exhaust unit.

In accordance with another aspect of the present invention, an outboard motor comprises a housing unit. An internal combustion engine is disposed above the housing unit. The engine has an internal exhaust passage. An exhaust guide member is positioned between the housing unit and the engine to support the engine atop the housing unit. The exhaust guide member defines first and second exhaust passages. The first exhaust passage communicates with the internal exhaust passage of the engine. The second exhaust passage communicates with an exhaust discharge passage defined within the housing unit. A generally C-shaped exhaust unit is detachably affixed to the exhaust guide member. The exhaust unit is positioned generally rearward of the exhaust guide member. The exhaust unit defines another passage communicating with the first and second exhaust passages of the exhaust guide member. The exhaust unit passage extends generally normal to an axis of the engine's output shaft. At least one catalyzer is positioned within the exhaust unit passage.

BRIEF DESCRIPTION OF THE DRAWINGS

These and other features of this invention will now be described with reference to the drawings of preferred embodiments which are intended to illustrate and not to limit the invention. The drawings comprise ten figures.

DETAILED DESCRIPTION OF THE PREFERRED EMBODIMENTS OF THE INVENTION

Figure 1:
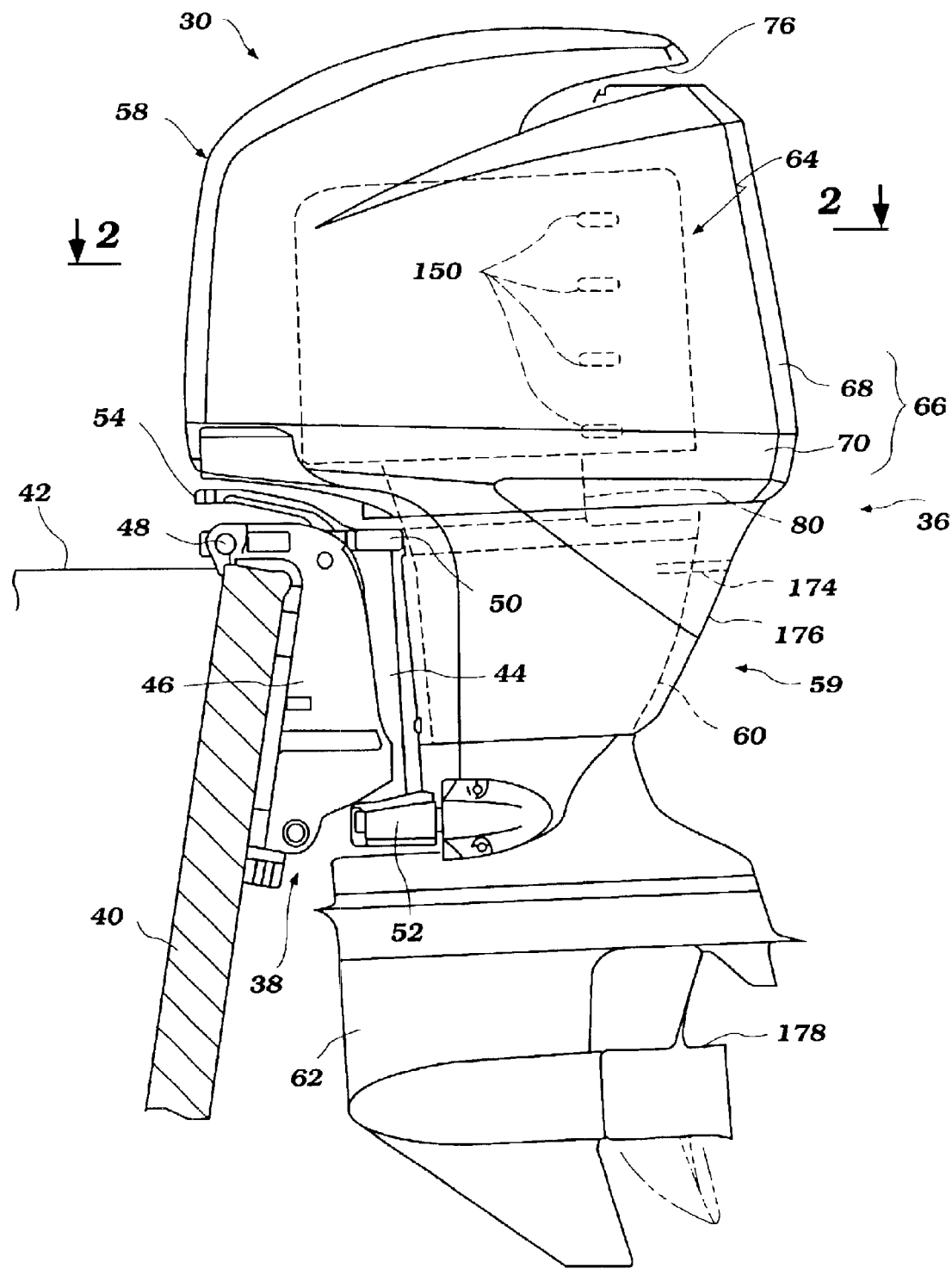
FIG. 1 is a side elevational view of an outboard motor configured in accordance with a preferred embodiment of the present invention. An associated watercraft on which the motor is mounted is partially shown in section.
Figure 2:
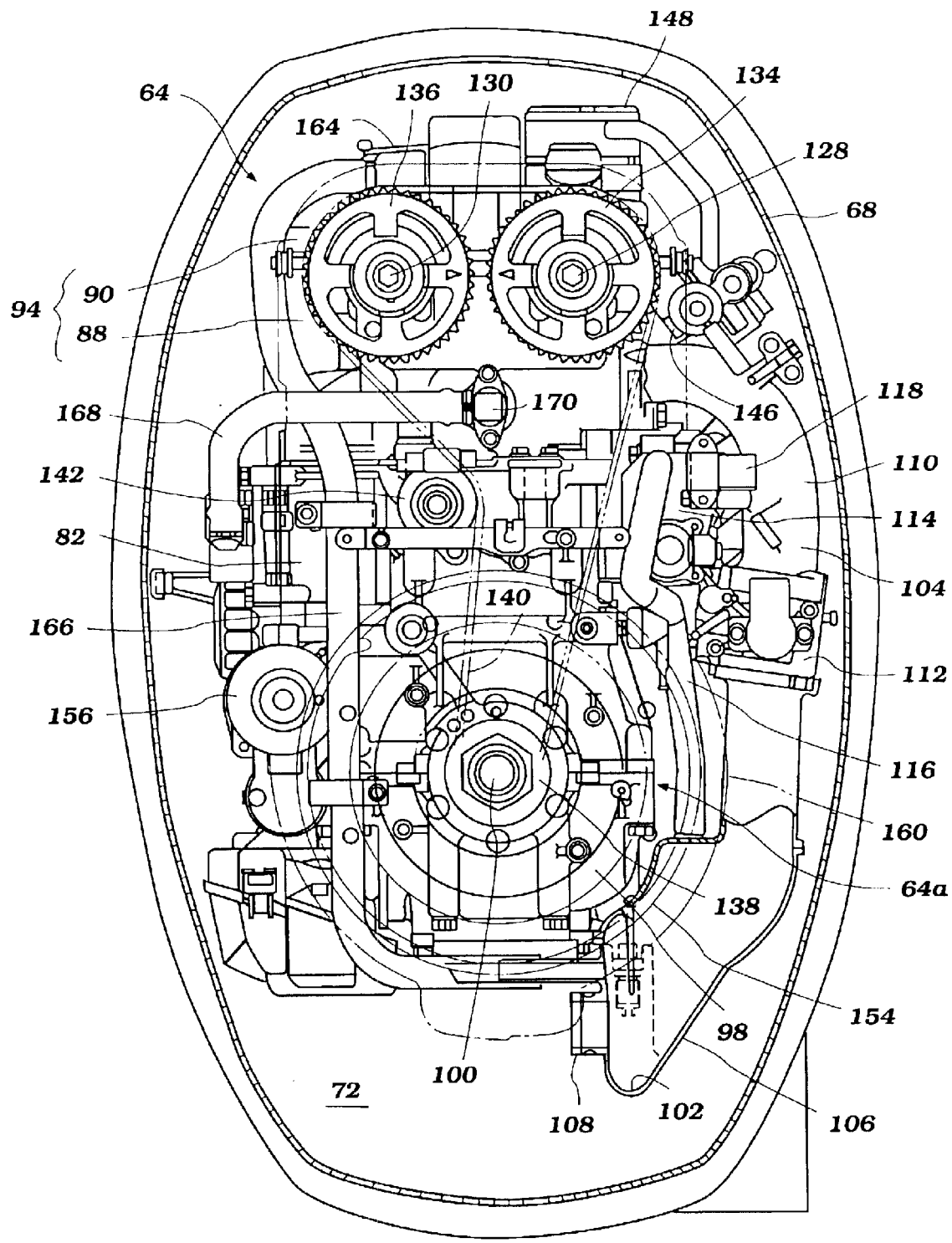
FIG. 2 is a top plan view of the outboard motor. A top cowling is illustrated in section taken along the line 2—2 of FIG. 1.
Figure 3:
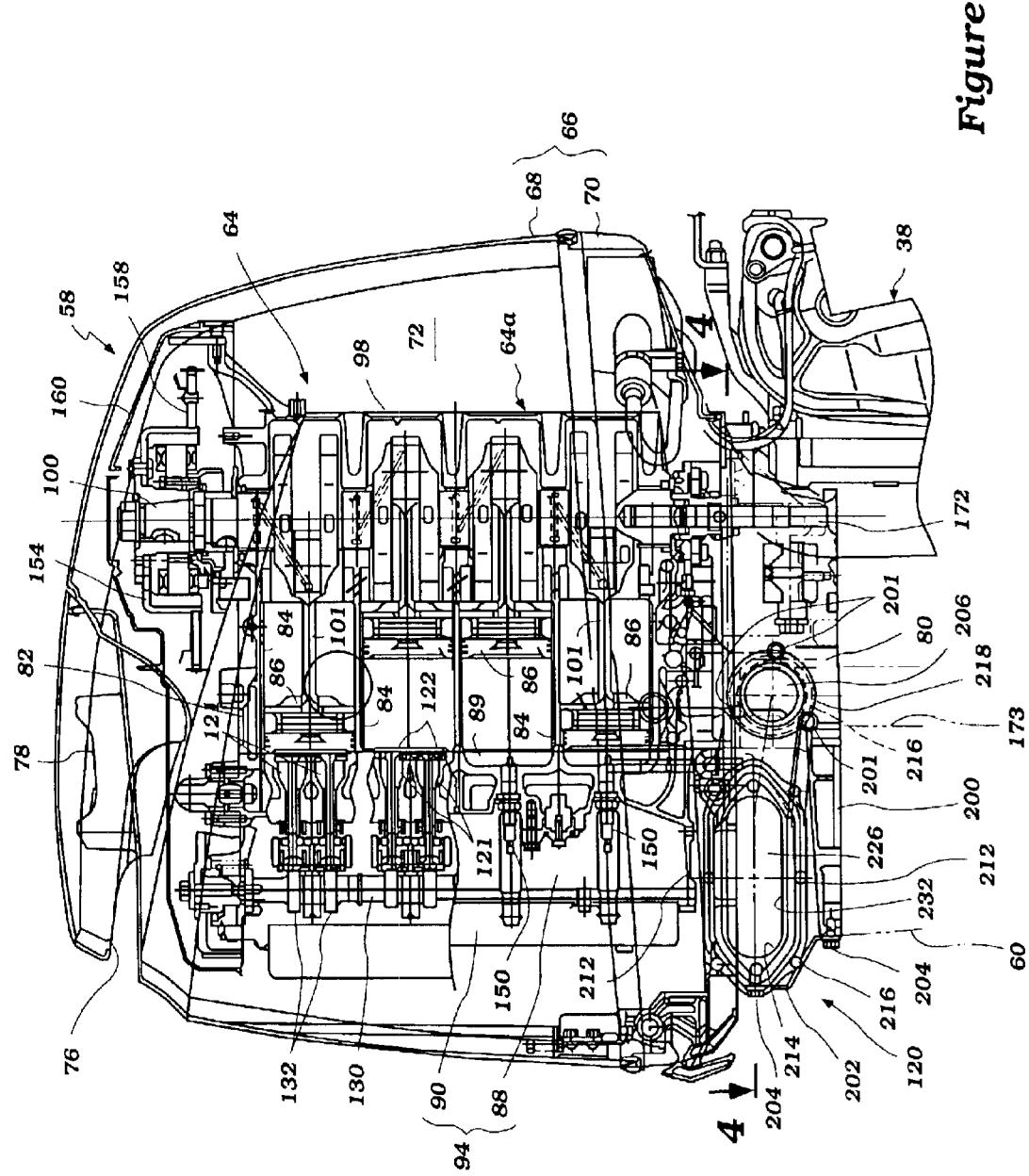
FIG. 3 is a side elevational view of a power head, an exhaust guide member and a portion of a bracket assembly shown in FIG. 1. The engine is generally shown in cross-section, and the protective cowling is illustrated in section.

With reference to FIGS. 1 to 3, an overall construction of an outboard motor 30 configured in accordance with a preferred embodiment of the present invention will be described below.

In the illustrated embodiment, the outboard motor 30 comprises a drive unit 36 and a bracket assembly 38. The bracket assembly 38 supports the drive unit 36 on a transom 40 of an associated watercraft 42 so as to place a marine propulsion device in a submerged position with the watercraft 42 resting on the surface of a body of water. The bracket assembly 38 comprises a swivel bracket 44, a clamping bracket 46, a steering shaft and a pivot pin 48.

The steering shaft extends through the swivel bracket 44 and is affixed to the drive unit 36 with an upper mount assembly 50 and a lower mount assembly 52. The steering shaft is pivotally journaled for steering movement about a generally vertically extending steering axis within the swivel bracket 44. A steering handle 54 extends upwardly and forwardly from the steering shaft to steer the drive unit 36. The clamping bracket 46 includes a pair of bracket arms spaced apart from each other and affixed to the watercraft transom 40. The pivot pin 48 completes a hinge coupling between the swivel bracket 44 and the clamping bracket 46. The pivot pin 48 extends through the bracket arms so that the clamping bracket 46 supports the swivel bracket 44 for pivotal movement about a generally horizontally extending tilt axis of the pivot pin 48.

As used through this description, the terms "fore," "front," "forward" and "forwardly" mean at or to the end of the outboard motor where the clamping bracket 46 is located, and the terms "aft," "rear," "rearward," and "rearwardly" mean at or to the opposite end of the outboard motor, unless indicated otherwise or otherwise readily apparent from the context of use. "Lateral" means at or to a side of either the outboard motor or a component of the outboard motor. "Longitudinal" means in a fore-aft direction and "transverse" means in a direction normal to the longitudinal direction, between and across the lateral sides of the outboard motor.

A hydraulic tilt and trim adjustment system preferably is provided between the swivel bracket 44 and the clamping bracket 46 to tilt (raise or lower) the swivel bracket 44 and the drive unit 36 relative to the clamping bracket 46. Otherwise, the outboard motor 30 can have a manually operated system for tilting the drive unit 36. Typically, the term "tilt movement," when used in a broad sense, comprises both the tilt movement and a trim adjustment movement.

The drive unit 36 comprises a power head 58 and a housing unit 59 which includes a driveshaft housing 60 and a lower unit 62. The power head 58 is disposed atop the drive unit 36 and includes an internal combustion engine 64 and a protective cowling assembly 66.

The protective cowling assembly 66 includes a top cowling member 68 and a bottom cowling member 70. The cowling assembly 66 defines a generally closed cavity 72 to enclose the engine 64 therein. The top cowling member 68 is detachably affixed to the bottom cowling member 70 so that the operator can make access to the engine 64 for maintenance or for other purposes.

The top cowling member 68 includes an air intake opening 76 at a rear top portion of the top cowling member 68 and an air intake duct 78 (FIG. 3) disposed internally of the opening 76. The ambient air can be introduced into the cavity 72 through the opening 76 and the intake duct 78.

The bottom cowling member 70 preferably has an opening at a bottom portion thereof through which a top portion of an exhaust guide member 80 extends. The exhaust guide member 80 preferably is made of an aluminum based alloy and is affixed atop the driveshaft housing 60. The bottom cowling member 70 preferably is affixed to the exhaust guide member 80 to form a tray together with the exhaust guide member 80. The engine 64 is placed onto this tray and is affixed to the exhaust guide member 80. The exhaust guide member 80 also defines exhaust passages through which burnt charges (e.g., exhaust gases) from the engine 64 are discharged. The exhaust guide member 80 and its exhaust passages will be described in greater detail below with reference to additional figures.

With particular reference to FIGS. 2 and 3, the engine 64 in the illustrated embodiment operates on a four-stroke combustion principle and powers a propulsion device. The engine 64 has a cylinder block 82 that defines four cylinder bores 84 which are spaced apart from each other generally vertically and which extend generally horizontally. That is, the engine 64 is a L4 (in-line four cylinder) type. This type of engine, however, is merely exemplary and engines having other number of cylinders, having other cylinder arrangements, and operating on other combustion principals (e.g., crankcase compression two-stroke or rotary) are all practicable.

As used in this description, the term "horizontally" means that the subject portions, members or components extend generally in parallel to the water line where the associated watercraft 42 is resting when the drive unit 36 is not tilted and is placed in the position shown in FIG. 1. The term "vertically" in turn means that portions, members or components extend generally normal to those that extend horizontally.

A piston 86 can reciprocate in each cylinder bore 84. A cylinder head member 88 is affixed to one end of the cylinder block 82 to define combustion chambers 89 with the pistons 86 and the cylinder bores 84. A cylinder head cover member 90 is affixed to the cylinder head member 88 to cover the cylinder head member 88. The cylinder head member 88 and cylinder head cover member 90 together form a cylinder head assembly 94, i.e., perpendicularly to the water line.

The other end of the cylinder block 82 is closed with a crankcase member 98 to define a crankcase chamber with the cylinder bores 84. A crankshaft 100 extends generally vertically through the crankcase chamber. The crankshaft 100 is journalled for rotation by the cylinder block 82 and the crankcase member 98. The crankshaft 100 is connected to the pistons 86 by connecting rods 101 and rotates with the reciprocal movement of the pistons 86. The crankshaft in this application thus rotates about a generally vertically oriented axis so as to define a rotational axis of the engine. (In engines which do not use a crankshaft, the rotational axis of the engine is defined by rotational axis of the engine's output shaft.)

The crankcase member 98 is located at the most forward position with the cylinder block 82 and the cylinder head assembly 94 extending rearward from the crankcase member 98 one after another. The cylinder block 82, the cylinder head assembly 94 and the crankcase member 98 together form an engine body 64a.

The engine 64 preferably includes an air induction system to supply air charges to the combustion chambers 89. With particular reference to FIG. 2, the air induction system preferably comprises a single plenum chamber 102, four outer intake passages 104 and four inner intake passages. Each inner intake passage is formed within the cylinder head member 88 and communicates with the associated combustion chamber 89 through one or more intake ports which are opened and closed by intake valves. When each intake port is opened, the corresponding inner intake passage communicates with the associated combustion chambers 89.

The plenum chamber 102 functions as an intake silencer and/or a coordinator of air charges. A plenum chamber member 106, which preferably is made of plastic, defines the plenum chamber 102 and is mounted on the port side of the crankcase member 98. The illustrated plenum chamber member 102 also forms four conduit sections in which upstream part of the outer intake passages 104 are defined. The plenum chamber member 106 has an air inlet opening 108 that opens to the cavity 72. Air is taken into the plenum chamber 102 through the inlet opening 108 from the cavity 72.

Four runners 110 are mounted on the cylinder head member 88 to form downstream part of the outer intake passages 104. The conduit sections of the plenum chamber member 106 and the runners 110 interpose four throttle bodies 112. The conduit sections and the runners 110 extend along the engine body 64a on the port side with the throttle bodies 112 held therebetween. The air in the plenum chamber 102 thus is delivered to the combustion chambers 89 through the outer intake passages 104 and the inner intake passages via the throttle bodies 112.

The respective throttle bodies 112 journal butterfly-type throttle valves therein for pivotal movement about axes of valve shafts extending generally vertically. The valve shafts are linked together to form a single valve shaft that passes through the entire throttle bodies 112. The throttle valves are operable by the operator through a suitable throttle cable and a linkage mechanism so that the valves allow proper amounts of air to pass through the respective outer intake passages 104 in response to the engine operations. When the operator operates the throttle cable, the linkage mechanism activates the valve shaft to open the throttle valves. Conversely, when the throttle cable is released, the linkage mechanism activates the valve shaft to close the throttle valves. Normally, the greater the opening degree of the throttle valves, the higher the rate of airflow and the higher the engine speed.

The air induction system further includes an idle air supply unit 114. The idle air supply unit 114 bypasses the throttle valves. An upstream bypass conduit 116 couples the unit 114 with the plenum chamber member 106, while a downstream bypass conduit 118 couples the unit 114 with one of the runners 110. The idle air supply unit 114 contains a valve member moveably disposed therein. When the throttle valves in the throttle bodies 112 are almost closed at idle, the valve member in the idle air supply unit 114 is operated so as to supply the necessary air to the combustion chambers 89 under control of an ECU (Electronic Control Unit), which is an electrically operable control device disposed in the cavity 72 and preferably is affixed to the engine body 64a.

The engine 64 preferably is provided with an exhaust system that includes an exhaust unit 120. The exhaust system is arranged to discharge exhaust gases to a location outside of the outboard motor 30 from the combustion chambers 89. Inner exhaust passages 121 are formed in the cylinder head member 88 and communicate with the combustion chambers 89 through one or more exhaust ports per each exhaust passage 121. The exhaust ports are opened or closed by exhaust valves 122. The illustrated cylinder block 82 defines an exhaust manifold internally that is arranged downstream of the exhaust ports. Otherwise, a separate member can define the exhaust manifold. When the exhaust ports are opened, the combustion chambers 89 communicate with the exhaust manifold. The exhaust manifold thus gathers the exhaust gases to deliver them to the exhaust passage of the exhaust guide member 80. The exhaust gases are discharged to a location external of the motor 30 through the exhaust passages in the exhaust guide member 80 and other succeeding exhaust passages. The exhaust unit 120 includes one of the exhaust passage sections and is positioned generally rearward of the exhaust guide member 80.

An intake camshaft 128 and an exhaust camshaft 130 extend generally vertically and parallel to each other to actuate the intake valves and the exhaust valves 122, respectively. The camshafts 128, 130 have cam lobes 132 thereon to push the intake valves and the exhaust valves 122 at certain timings to open and close the intake ports and exhaust ports. The camshafts 128, 130 are journaled for rotation on the cylinder head assembly 94 and are driven by the crankshaft 100. The respective camshafts 128, 130 have sprockets 134, 136 thereon, while the crankshaft 100 also has a sprocket 138 thereon. A flexible transmitter such as, for example, a timing belt or chain 140 is wound around the sprockets 134, 136, 140. The camshafts 128, 130 thus rotate with rotation of the crankshaft 100. An idler type tensioner 142 is also provided to adjust the tension of the flexible transmitter 140 by pushing it inwardly so as to keep the opening and closing timing of the intake valves and the exhaust valves 122 accurate. The tensioner 142 can include, for example, a gas cylinder containing compressed gases therein to produce the tensioning force.

With particular reference to FIG. 2, the engine 64 preferably has a port or manifold fuel injection system. The fuel injection system includes four fuel injectors 146 which have injection nozzles directed to the respective intake ports. The fuel injectors 146 are supported by a fuel rail that is affixed to the cylinder head member 88. The fuel injection system further includes a vapor separator, several fuel pumps, a pressure regulator, a fuel supply tank, a fuel filter and several fuel conduits connecting those components. Generally the fuel supply tank is disposed on a hull of the associated watercraft 42 and the other components are placed on the outboard motor 30. One of the fuel pumps is a high pressure pump 148 mounted on the cylinder head cover member 90. An amount of each fuel injection and injection timing are controlled by the ECU. Of course, in some arrangements, the fuel injectors 146 can be disposed for direct cylinder injection and, in other arrangements, carburetors can replace or accompany the fuel injectors.

With particular reference to FIG. 3, the engine 64 further has a firing or ignition system. Four spark plugs 150 are mounted on the cylinder head member 88 so as to expose electrodes of the plugs 150 to the respective combustion chambers 89. The spark plugs 150 can be installed and removed from the rear side of the engine 64 by detaching the top cowling member 68 from the bottom cowling member 70. This is the same side on which the exhaust unit 120 is provided.

The spark plugs 150 fire an air/fuel charge in the combustion chambers 89 at a proper timing. This firing timing also is controlled by the ECU. The air/fuel charge is formed with an air charge supplied by the intake passages 104 or the idle air supply unit 114 and a fuel charge is sprayed by the fuel injectors 146. The burnt charge or exhaust gases are discharged outside through the exhaust system as described above.

A flywheel assembly 154 (FIG. 3) is affixed atop the crankshaft 100. The flywheel assembly 154 includes a generator to supply electric power to the firing system, to the ECU and to other electrical equipment via a battery usually disposed in the hull of the watercraft 42. A starter motor 156 (FIG. 2) is mounted on the cylinder block 82 adjacently to the flywheel assembly 154. A gear of the starter motor 154 is meshed with a ring gear 158 (FIG. 3) that is provided on a periphery of the flywheel assembly 154 through a one-way clutch. The starter motor 156 rotates the crankshaft 100 via the flywheel assembly 154 when the operator operates a main switch. Because, however, the starter gear and the ring gear 158 are coupled together by the one-way clutch, the crankshaft 100 cannot rotate the starter motor 156 immediately after starting of the engine 64. A protector 160 covers the flywheel assembly 154, starter motor 156, sprockets 134, 136, 138 and the belt 140 for protection of components disposed atop the engine body 64a.

The engine 64 preferably has a lubrication system. A lubricant reservoir (not shown) depends from the exhaust guide member 80 within the driveshaft housing 60. A lubricant pump is driven by the driveshaft 100 to supply lubricant to engine portions that need lubrication. The lubricant then drains to the lubricant reservoir. The engine portions that need the lubrication include the pistons 86 that furiously reciprocate within the cylinder bores 84. The pistons 86 need the lubrication not to seize on surfaces of the cylinder bores 84. Piston rings are provided on the pistons 86 to isolate the combustion chambers 89 from the crankcase chambers. At least one piston ring can remove the oil from the surface of the cylinder bore 84 and carry it out to the crankcase chamber.

Unburned charges containing a small amount of the exhaust gas may leak to the crankcase chamber from the combustion chambers 89 as blow-by gas because of the huge pressure generated therein, although the piston rings isolate them. The engine 64 has a ventilation system that delivers the blow-by gases to the induction system to burn the gases in the combustion chambers 89.

The ventilation system comprises an inner blow-by gas conduit, an oil separator or breather 164 (FIG. 2) and an outer blow-by gas conduit 166. The inner conduit is formed internally of the crankcase member 98, cylinder block 82 and cylinder head assembly 94 and connects the crankcase chamber with the oil separator 164. The oil separator 164 is mounted on the cylinder head cover member 90 and has a labyrinth structure therein to separate the oil component from the blow-by gases. The outer blow-by gas conduit 166 couples the oil separator 164 to the plenum chamber member 106 so as to supply the blow-by gases to the induction system.

The engine 64 further has a cooling system that provides coolant to engine portions, for example, the cylinder block 82 and the cylinder head assembly 94, and also to the exhaust system because those components accumulate significant heat during engine operations. In the illustrated embodiment, water is used as the coolant and is introduced from the body of water surrounding the outboard motor 30, as will be described later.

The water introduced into the cooling system is delivered to the engine portions through cooling water jackets. After cooling the engine portions, the water is discharged to a location outside through a discharge conduit 168 (FIG. 2) and a water discharge jacket formed in the cylinder block 82. A thermostat 170 is provided at the most upstream portion of the discharge conduit 168. If the temperature of the water is lower than a preset temperature, the thermostat 168 will not allow the water to flow out to the discharge conduit 168 so that the engine 64 can warm up properly. The cooling system will be described in greater detail later.

With reference to FIGS. 1 and 3, the driveshaft housing 60 is positioned below the exhaust guide member 80. A driveshaft 172 coupled with the crankshaft 100 generally vertically extends through the exhaust guide member 80 and then extends through the driveshaft housing 60. The driveshaft 172 is journalled for rotation in the driveshaft housing 60 and is driven by the crankshaft 100. The driveshaft housing 60 also defines an internal passage 173 which form a portion of the exhaust system. An idle exhaust passage 174 is branched off from the internal passage 173 and opens to the atmosphere above the body of water. In the illustrated embodiment, an apron 176 covers an upper portion of the driveshaft housing 60. The idle exhaust passage 174 extends through both an outer surface of the driveshaft housing 60 and the apron 176.

The lower unit 62 depends from the driveshaft housing 60 and journals a propulsion shaft (not shown) for rotation to be driven by the driveshaft 172. The propulsion shaft extends generally horizontally through the lower unit 62 to support a propulsion device. In the illustrated embodiment, the propulsion device is a propeller 178 that is affixed to an outer end of the propulsion shaft. The propulsion device, however, can take the form of a dual, a counter-rotating system, a hydrodynamic jet, or like propulsion devices.

A transmission (not shown) is provided between the driveshaft 172 and the propulsion shaft. The transmission couples together the two shafts which lie generally normal to each other (i.e., at a 90° shaft angle) with a bevel gear train or the like. The transmission has a switchover mechanism to shift rotational directions of the propeller 178 among forward, neutral or reverse positions. The switchover mechanism is operable by the operator through a shift linkage including a shift cam, a shift rod and a shift cable.

The lower unit 62 also defines an additional internal passage that forms a discharge section of the exhaust system. At engine speed above idle, the majority of the exhaust gases are discharged toward the body of water through the internal passage and a hub of the propeller 178. At the idle speed of the engine 64, the exhaust gases can be discharged only through the idle exhaust passage 174 because the exhaust pressure under this condition is smaller than the back pressure created by the body of water.

Additionally, the driveshaft housing 60 has a water pump that is driven by the driveshaft 172 and supplies cooling water to the cooling system. Water is introduced through a water inlet (not shown) which opens at the lower unit 62. The water inlet is connected to the water pump through an inlet passage, while the water pump is connected to the engine portions and the exhaust system.

With continued reference to FIG. 3 and additional reference to FIGS. 4 and 5, the exhaust unit 120 and connections thereof with other part of the exhaust system and with the cooling system will now be described in great detail.

The exhaust unit 120 is positioned generally rearwardly relative to the exhaust guide member 80 as described above. The exhaust guide member 80 includes a projection 200 (FIG. 3) at which a rear portion of the exhaust guide member 80 is coupled with a top, rear portion of the driveshaft housing 60. The exhaust unit 120, at least in part, extends through a space that is formed generally between a top surface of the projection 200 and a bottom surface of the cylinder head assembly 94. The exhaust unit 120 is affixed to the exhaust guide member 80 on either lateral sides of the exhaust guide member 80 by bolts 201 via gaskets (not shown). A bracket 202 extending generally upwardly from a rear-most end of the projection 200 also is used to fix the unit 120 onto the projection 200 by bolts 204. The bottom cowling member 70 partially surrounds a top portion of the exhaust unit 120. The apron 176 continuously surrounds the reminder of the exhaust unit 120 and the projection 200.

The exhaust unit 120 preferably is positioned lower than the spark plug 150 that is placed at the lowermost position. The exhaust unit 120 also is positioned higher than the discharge opening of the idle exhaust passage 174. In addition, the entire body of the illustrated exhaust unit 120 is positioned higher than the driveshaft housing 60.

Figure 4:
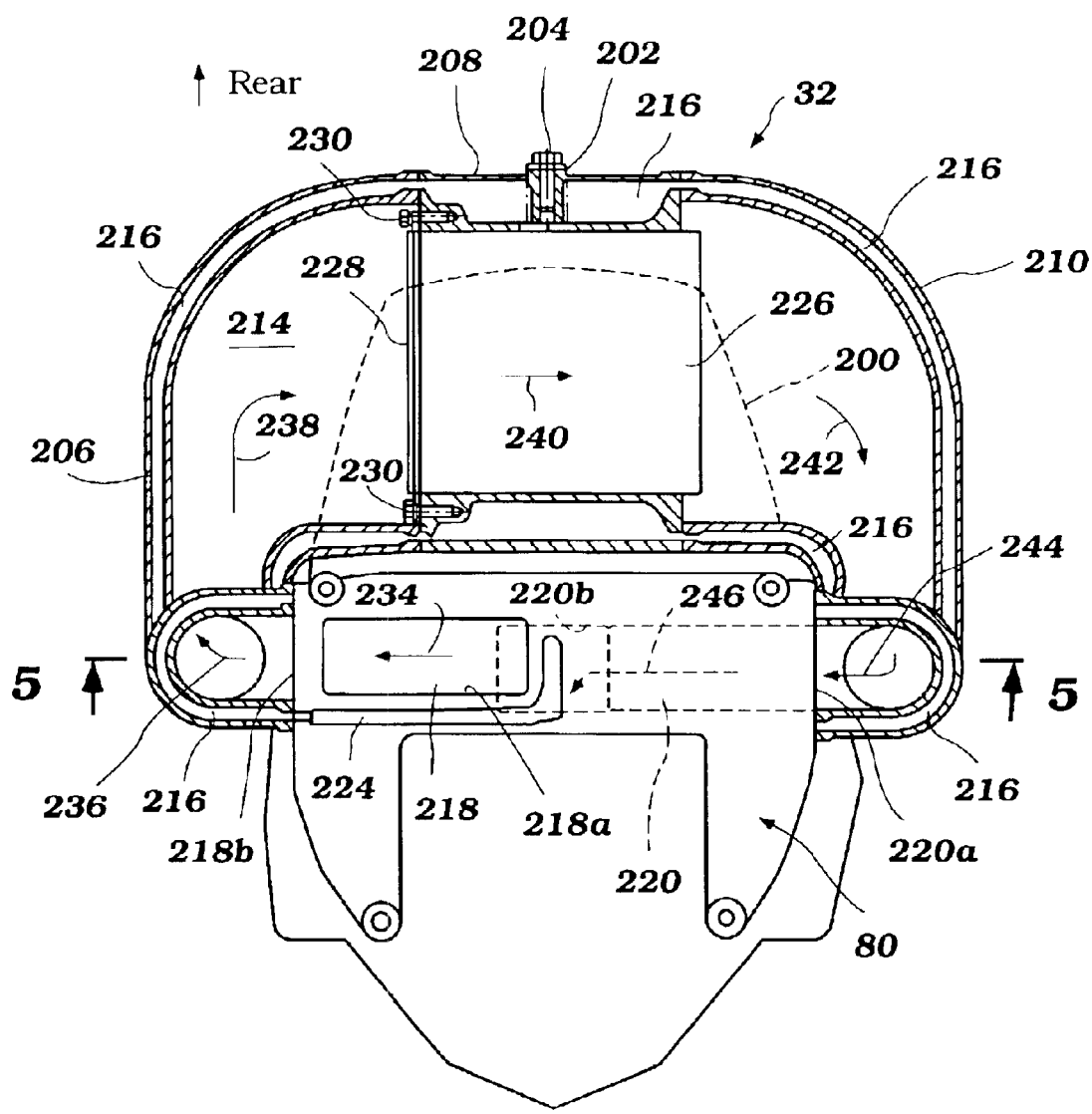
FIG. 4 is a top plan view of the exhaust guide member and a cross-sectional, top plan view of the exhaust unit taken generally along the line 4—4 of FIG. 3.

With particular reference to FIG. 4, the exhaust unit 120 preferably comprises three laterally separable members 206, 208, 210 that are coupled together by bolts 212 (FIG. 3) and are sealed together by gaskets (not shown). The illustrated separable members 206, 208, 210 are arranged symmetrically in the top plan view. More specifically, the middle separable member 208 is interposed between the other separable end members 206, 210. Preferably, these members 206, 208, 210 are formed as coaxial double jackets or double conduits. The inner jacket defines an exhaust unit passage 214, while the outer jacket defines a water passage 216. The water passage 216 thus surrounds the exhaust passage 214 in the illustrated preferred embodiment; however, the water passage 216 can extend along or about only a portion of the exhaust passage 214.

Figure 5:
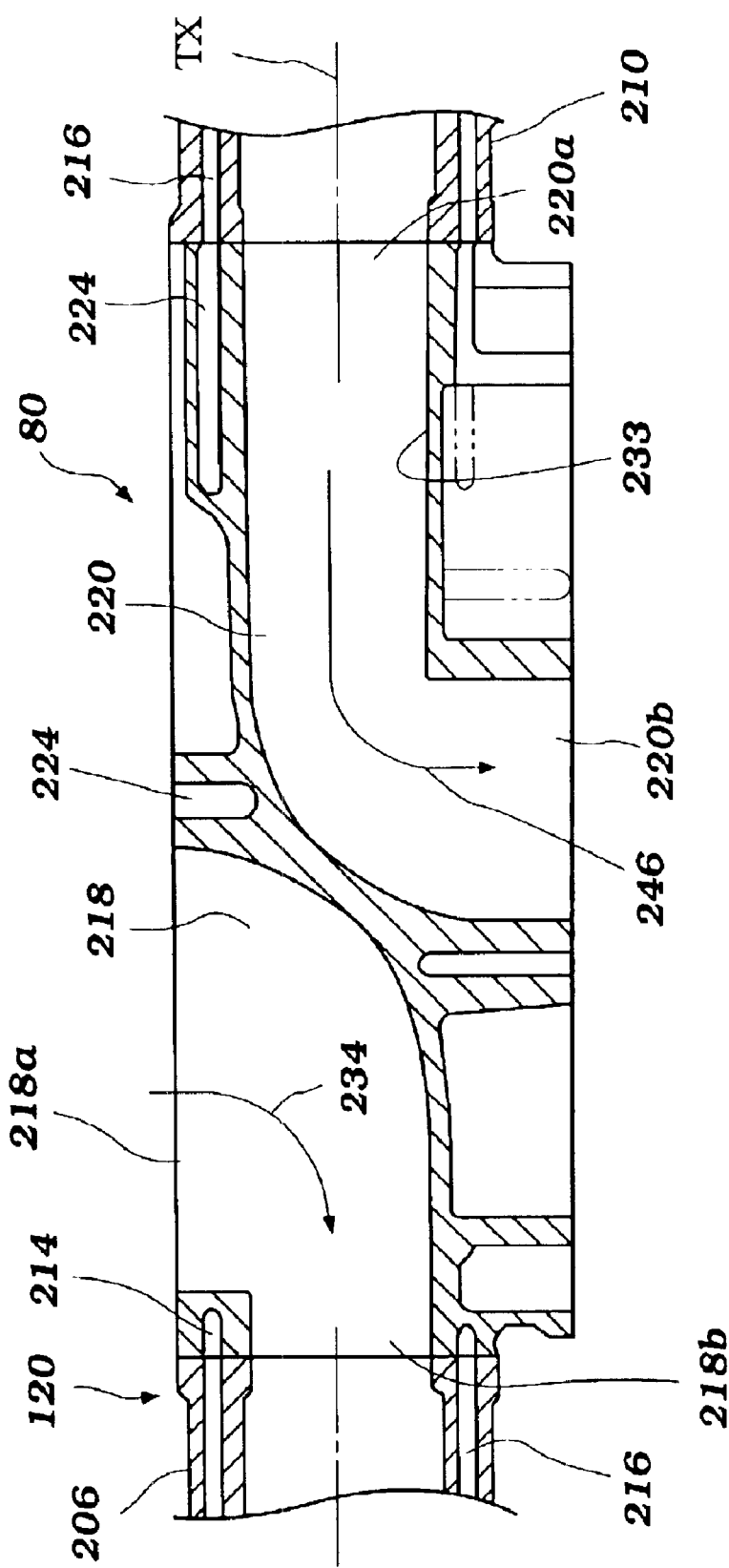
FIG. 5 is a cross-sectional view taken along the line 5—5 of FIG. 4.

With particular reference to FIG. 5, the exhaust guide member 80 preferably defines two exhaust passages 218, 220. One exhaust passage (i.e., a first exhaust passage) 218 communicates with the exhaust manifold formed internally in the engine 64. The other exhaust passage (i.e., a second exhaust passage) 220 communicates with the internal passage 173 formed in the driveshaft housing 60. Both the passages 218, 220 are formed next to each other to generally equally divide a space in the exhaust guide member 80. The first and second exhaust passages 218, 220 also are surrounded by a water jacket 224.

The first passage 218 has an inlet port 218a through which the first passage 218 is connected to the exhaust manifold and has an outlet port 218b through which the first passage 218 is connected to the exhaust unit passage 214 of the exhaust unit 120, i.e., the separable end member 206. The second passage 220, in turn, has an inlet port 220a through which the second passage 220 is connected to the exhaust unit passage 214, i.e., the other separable end member 210, and has an outlet port 220b through which the second passage 220 is connected to the internal passage 173 of the driveshaft housing 60. The outlet port 218b of the first passage 218 and the inlet port 220a of the second passage 220 are generally aligned along a transversely extending axis TX. The inlet port 218a of the first passage 218 and the outlet port 220b of the second passage 220 partially overlap in the top plan view as best shown in FIG. 4. In other words, a center of the inlet port 218a and a center of the outlet port 220b extend generally vertically and parallel to each other. The water passage 224 surrounding the first and second passages 218, 220 is connected to the water passage 216 of the exhaust unit 120.

Because the exhaust unit 120 is connected to the exhaust passages 218, 220 at both lateral sides of the exhaust guide member 80, the extra passage 214 of the exhaust unit 120 generally extends around the rear half of the exhaust guide member 80 over the projection 200 to form a relatively long straight portion therein. That is, the exhaust unit 120 is generally shaped as the letter C that has a center portion which is relatively straight in the top plan view as shown in FIG. 4.

In the illustrated embodiment, the exhaust unit 120 is generally configured as an oval shape in the rear of the exhaust guide member 80 as shown in FIG. 3. That is, the shape of the unit's cross-section, when taken normal to a flow axis through the center of the exhaust unit passage 214 at the center portion of the exhaust unit 120, is generally oval. The middle separable member 208 of the exhaust unit 120, which is positioned at the center of the three separable members 206, 208, 210, has the same shape and supports a monolithic catalyzer 226. The catalyzer 226 is configured as an oval shape that is similar to the shape of the center member 208 and is enclosed in a metal case except for both end portions thereof. The exhaust unit passage 214 within the center member 208 has a slightly narrow inner diameter, while the catalyzer 226 has generally the same outer diameter as the inner diameter of the center member 208. In the illustrated embodiment, the middle separable member 208 thus holds the catalyzer 226 fully with its inner surface; however, in other variations, the catalyzer 226 can be housed within multiple members of the exhaust unit 120. A bracket 228 (FIG. 4) is coupled with the catalyzer 226 and is affixed to the center member 208 by screws 230 to securely mount the catalyzer 226 on the center member 208. The bracket 228 is generally configured as an oval-shape so that the entire surface of the catalyzer 226 confronts the exhaust flow. Thus, the exhaust gases can flow into the catalyzer 226 generally evenly across the end of the catalyzer 226. The bracket 228 preferably has a mesh covering this portion.

The catalyzer 226 causes a chemical reaction that renders certain of the exhaust gas constituents harmless. The catalyzer 226 has a carrier member that carries, for example, a three-way catalyst element. The three-way catalyst element can oxidize CO and HC and reduce NOx contained in the exhaust gases. Thus, the exhaust gases are purified when passing through the catalyzer 226. It should be noted, however, that any conventional catalyzers can be applied in complying with various purposes and/or regulations. For example, a catalyzer that has a carrier member carrying a catalyst element which is particularly efficient in reducing NOx can replace the catalyzer 226.

An inner bottom 232 (FIG. 3) of the center member 208 preferably is positioned higher than an inner bottom 233 (FIG. 5) of the second passage 220 of the exhaust guide member 80. This arrangement is beneficial because water, if any, in the exhaust unit 120 will flow to the second passage 220 to be discharged to the internal passage 173 of the driveshaft housing 60. The catalyzer 226 thus is less likely to be harmed by the water.

With particular reference to FIGS. 4 and 5, when the air/fuel charge burns in the combustion chambers 89, a burnt charge, i.e., exhaust gases, are produced therein. The exhaust gases are discharged from the combustion chambers 89 to the inner exhaust passages of the cylinder head member 88 through the exhaust ports and then to the exhaust manifold. The exhaust gases pass down to the first exhaust passage 218 of the exhaust guide member 80 and move into the exhaust unit passage 214 of the exhaust unit 120 as indicated by the arrows 234, 236, 238 along the flow axes of these passages. The exhaust gases then pass through the catalyzer 226 to be purified thereby as indicated by the arrow 240, and flow into the second exhaust passage 220 of the exhaust guide member 80 as indicated by the arrows 242, 244. Next, the exhaust gases flow down through the internal passage 173 of the driveshaft housing 60 as indicated by the arrows 246, and further through the internal passage of the lower unit 62. Finally the exhaust gases are discharged through the hub of the propeller 178 to the body of water when the engine 64 operates above idle speed. If the engine 64 operates at or below the idle speed, the gases move through the idle exhaust passage 174 and out to the atmosphere. Since the entire exhaust gases, whichever way they go to the body of water or to the atmosphere, must pass through the catalyzer 226, harmful constituents of the discharged exhaust gases from the outboard motor are effectively reduced.

Cooling water is supplied to the water jacket 224 in the exhaust guide member 80 and to the water passage 216 of the exhaust unit 120 directly by the water pump or indirectly after circulating through the engine portions. The cooling water flows around the first and second exhaust passages 218, 220 and the exhaust unit passage 214 to conduct heat away from the exhaust guide member 80, the exhaust unit 120 and the exhaust gases passing therethrough and also from the catalyzer 226.

In the illustrated embodiment, the catalyzer 226 is contained in the exhaust unit 120 which is placed in the dead space (i.e., previously unused space) behind the exhaust guide or support member 80 and, more specifically, between the bottom of the engine 64 and the upper surface of the projection 200 of the exhaust guide member 80. The exhaust unit 120 also can provide a sufficient length in the center member 208 to employ the catalyzer 226 that has a relatively large volume. Thus, no special and voluminous space is necessary to be created for furnishing the catalyzer 226.

The catalyzer 226 is located far from the exhaust ports of the engine 64. Because of this, the catalyzer 226 and the bracket 228 will not be damaged by the exhaust gases that have extremely high temperature.

As thus described, the catalyzer 226 is confined in the exhaust unit 120 that is attached to the exhaust guide member 80. The extra passage 214 in the unit 120 is branched from the main exhaust passages that passes through the engine 64, exhaust guide member 80, driveshaft housing 60 and the lower unit 62. In other words, main sections of an outboard motor such as an engine and a driveshaft housing do not need significant change in configuration. Thus, a number of existing outboard motors can easily employ this catalyzer arrangement. In addition, because of the detachable arrangement of exhaust unit 120, maintenance work involving removal and installation of the catalyzer 226 can be carried out quite more easily than with some other prior catalyzer arrangements.

Also, the water passage 216 of the exhaust unit 120 lies adjacent to the catalyzer 226 quite closely and along almost the entire length of the catalyzer 226. The heat of the catalyzer 226 thus can be transferred efficiently to the water flowing through the water passage 216.

Further, because the exhaust unit 120 exists lower than the spark plug 150 placed at the lowermost position, the unit 120 does not obstruct access to the spark plugs 150.

Additionally, the exhaust unit 120 is positioned higher than the discharge opening of the idle exhaust passage 174. The discharge opening of the idle exhaust passage 174 is surely located above the body of water so as to reduce the possibility of water reaching the exhaust unit 120. Even though some water may splash up to the position where the catalyzer 226 is located, the catalyzer unit 226 is completely contained in the exhaust unit 120 and is well isolated from such water. No particular protection, therefore, is necessary to protect the catalyzer 226 itself from the water.

The illustrated exhaust unit 120 is surrounded by the apron 176 to protect further the exhaust unit 120 and to improve the appearance of the outboard motor 30. However, the exhaust unit 120 can be partially or entirely exposed outside the apron 176. In this regard, the illustrated exhaust unit passage 214 is entirely surrounded by the water passage 216. This arrangement is advantageous because not only are exhaust gases efficiently cooled but also an outer shell of the exhaust unit 120 is cooled. Thus, part of or the entire body of the exhaust unit 120 can be exposed out of the protective cowling 66 and/or the apron 176.

With reference to FIGS. 6–10, another exhaust unit 250 modified in accordance with a second embodiment of the present invention will be described. The same members and components that have been described in connection with the first embodiment will be assigned with the same reference numerals and will not be repeatedly described.

The modified exhaust unit 250 has substantially the same construction as the exhaust unit 120 of the first embodiment except for three major features; the first feature is that the unit 250 extends rearward more than the unit 120, the second feature is that two different type catalyzers 252, 254 are provided instead of the single catalyzer 226 and the third feature is that sensors 256, 258 that sense exhaust conditions are additionally provided. The exhaust unit 250, like the exhaust unit 120, also defines the exhaust unit passage 214 therein and the water passage 216 surrounds the passage 214.

Figure 6:
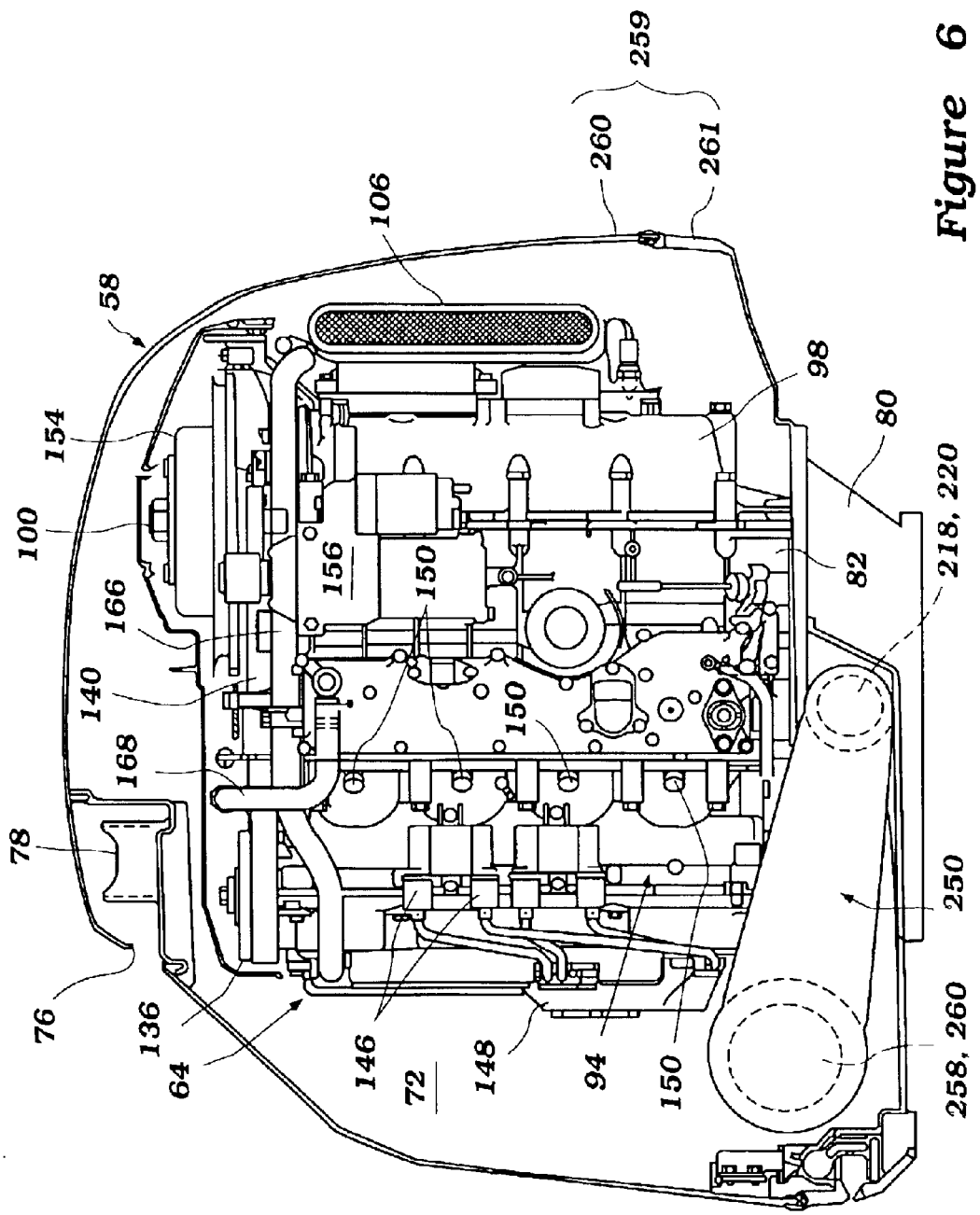
FIG. 6 is a side elevational view of a modification of the outboard motor shown in FIG. 1.

More specifically, the exhaust unit 250 in this embodiment extends beyond the space that is formed generally between the top surface of the projection 200 and the bottom surface of the cylinder head assembly 94. A protective cowling 259 comprising a top cowling member 260 and a bottom cowling member 261 is slightly expanded rearward and downwardly to accommodate the entire body of the exhaust unit 250 therein as shown in FIG. 6. Like the exhaust unit 120, the exhaust unit 250 comprises three members, i.e., a center member 262 and side members 264, 266. The members 262, 264, 266 are coupled with each other by bolts (not shown) with gaskets 268 disposed between the members. The side members 264, 266 and respective gaskets are coupled with the exhaust guide member 80 by bolts. Because the exhaust unit 250 extends out of the space between the engine and the exhaust guide, the center member 262 and portions of the side members 264, 266 can have a cylindrical configuration and can have an inner diameter larger than an inner diameter of either the first or second passage 218, 220. Cylindrically configured catalyzers are normally sold in the market. Installation cost for the catalyzer thus is not expensive. In addition, a catalyzer having a relatively large outer diameter can fit in the large inner diameter of the center member 262 and the portions of the side members 264, 266. The catalyzer thus can have greater efficiency than the prior embodiment.

The illustrated exhaust unit 250 contains a pair of such catalyzers 272, 274. The catalyzers 272, 274 preferably are placed in series. In this arrangement, the center member 262 and the side member 264 together hold the catalyzer 272, while the center member 262 and the side member 266 together hold the catalyzer 274. However, each one of the members 262, 264, 266 can solely hold one of the catalyzers 272, 274 or both of them. The catalyzers 272, 274 can be placed in parallel to each other. More than two catalyzers can be applied inasmuch as the exhaust unit 250 can have capacity sufficient enough for containing them therein.

The respective catalyzers 272, 274 preferably are different types and function differently from each other. In the arrangement, the catalyzer 272 includes the three-way catalyst element that can oxidize CO and HC and reduce NOx contained in the exhaust gases. The catalyzer 274, in turn, includes a catalyst element that is particularly efficient in reducing NOx. Any types of catalyzers can be combined. Meanwhile, the same type of catalyzers of course is applicable.

As noted above, the exhaust unit 250 preferably includes one or more sensors 256, 258. Preferably, the first sensor 256 is an air/fuel ratio sensor and more specifically an oxygen ($O_2$) sensor. The oxygen sensor 256 senses an amount of oxygen in the exhaust gases and sends a signal to the ECU. The ECU thus can recognize how much oxygen remains in the exhaust gases. Accordingly, the ECU can continuously recognize whether the air/fuel ratio is appropriate and can make adjustments to the air/fuel ratio based upon the sensed air/fuel ratio fed back to the ECU. In addition, because the exhaust unit 250 is provided, a location for fixing the oxygen sensor 256 can be found more easily than on a conventional outboard motor that has only the exhaust guide member.

The second sensor 258 can be an exhaust gas temperature sensor. The exhaust gas temperature sensor 258 senses temperature of the exhaust gases and send a signal to the ECU. The ECU can recognize whether the temperature of the exhaust gases, which is indicative of the temperature of the catalyzers 272, 274, excesses a preset temperature. With recognizing the excess temperature, the ECU can send a warning (for example, sounding an alarm or flashing an indicator lamp) to the operator of the watercraft that the catalyzers 272, 274 are exposed to abnormally high temperatures. Otherwise, the ECU can control the engine based upon this feedback signal to automatically slow down the engine operation in a conventional manner (e.g., cylinder disablement) or to take other proper measures. The catalyzers 272, 274 thus can be protected from exposure to excess heat.

The oxygen sensor 256 preferably is positioned upstream of the catalyzers 272, 272 to sense an accurate current air/fuel ratio in the combustion chambers 89. With reference to FIG. 8, the side member 264 defines a threaded hole 278 atop thereof. The oxygen sensor 256 is affixed to the threaded hole 278 with a threaded portion 280 thereof is screwed into the hole 278 along an axis 281 of the sensor 256. A tip portion 282 thus is exposed within the exhaust unit passage 214. A signal cable 284 extends generally upwardly toward the closed cavity 72 of the protective cowling 259 through the bottom cowling member 261 in the illustrated arrangement. Alternatively, if the sensor 256, particularly the signal cable 284 thereof, interferes with the top cowling member 260 when detaching or putting on of the top cowling member 260, the sensor 256 can be laid generally horizontally as shown in phantom line of FIG. 7 to avoid the interference. In other variations, the sensor needs not be hard wired to the ECU, but rather can transmit a signal to the ECU via inferred (IR), radio frequency (RF), or the like technology.

Figure 9:
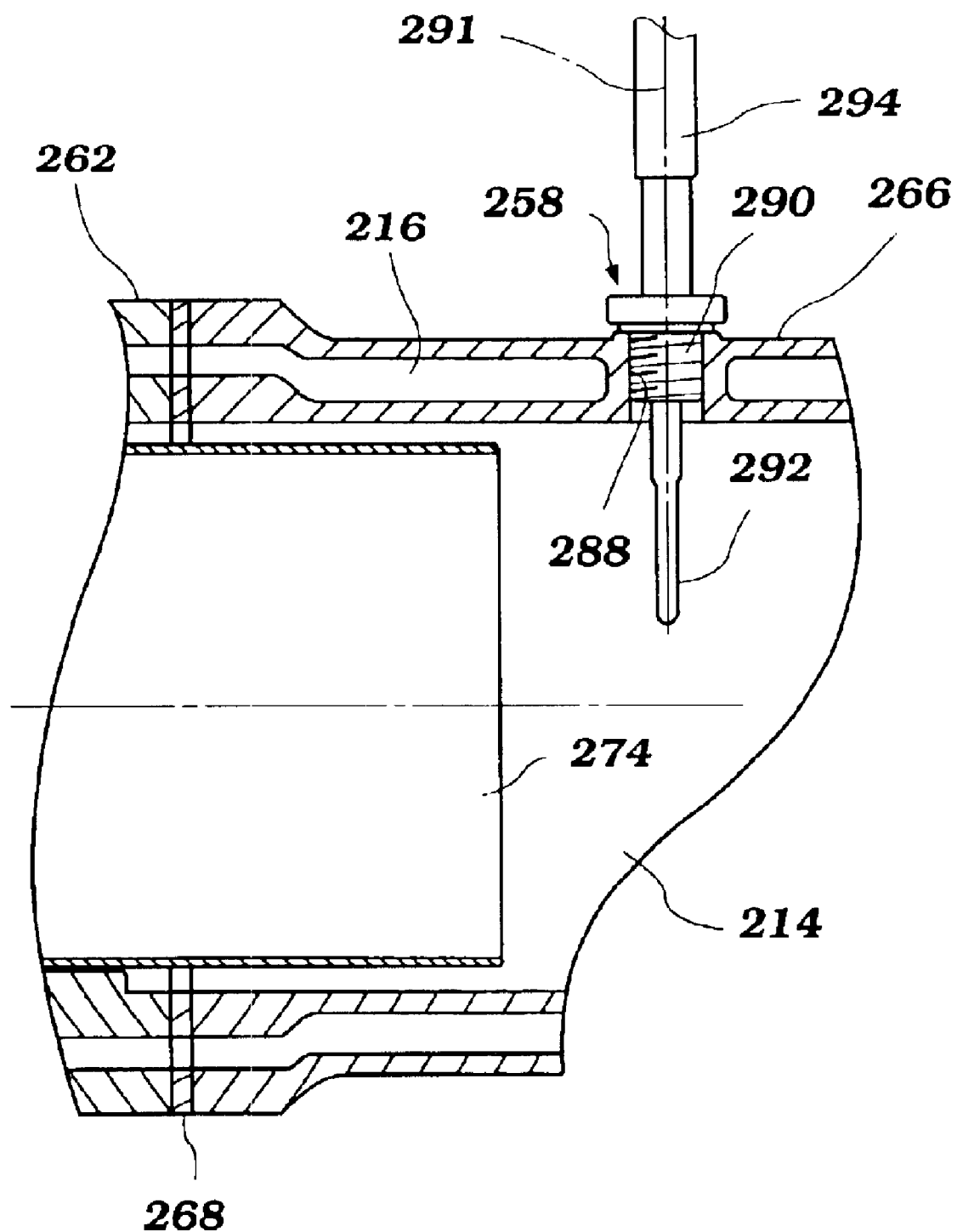
FIG. 9 is a sectional view taken along the line 9—9 of FIG. 7.

The exhaust gas temperature sensor 258 preferably is positioned downstream of and close to the catalyzer 274 to sense an accurate temperature of the exhaust gases surrounding the catalyzers 272, 274. With reference to FIG. 9, the side member 266 defines a threaded hole 288 atop thereof. The temperature sensor 258 is affixed to the threaded hole 288 with a threaded portion 290 thereof is screwed into the hole 288 along an axis 291 of the sensor 258. A tip portion 292 thus is exposed within the extra passage 214. A signal cable 294 extends generally upwardly toward the closed cavity 72 of the protective cowling 259 through the bottom cowling member 261 or in another arrangement. Alternatively, like the oxygen sensor 256, the sensor 258 can be laid generally horizontally as shown in phantom line of FIG. 7 to avoid the interference with the top cowling member 260. Again, the sensor 258 needs not be hard wired to the ECU, but rather can transmit a signal to the ECU via IR, RF or like technology.

Similarly to the first embodiment, the rear portion of the exhaust unit 250 that includes the center member 262 is positioned slightly higher than the second passage 220 of the exhaust guide member 80 as best shown in FIG. 6. In other words, the exhaust unit 250 is slightly inclined upwardly rearward. The water, if any, in the exhaust unit 250 will flow toward the internal passage of the driveshaft housing 60.

Figure 7:
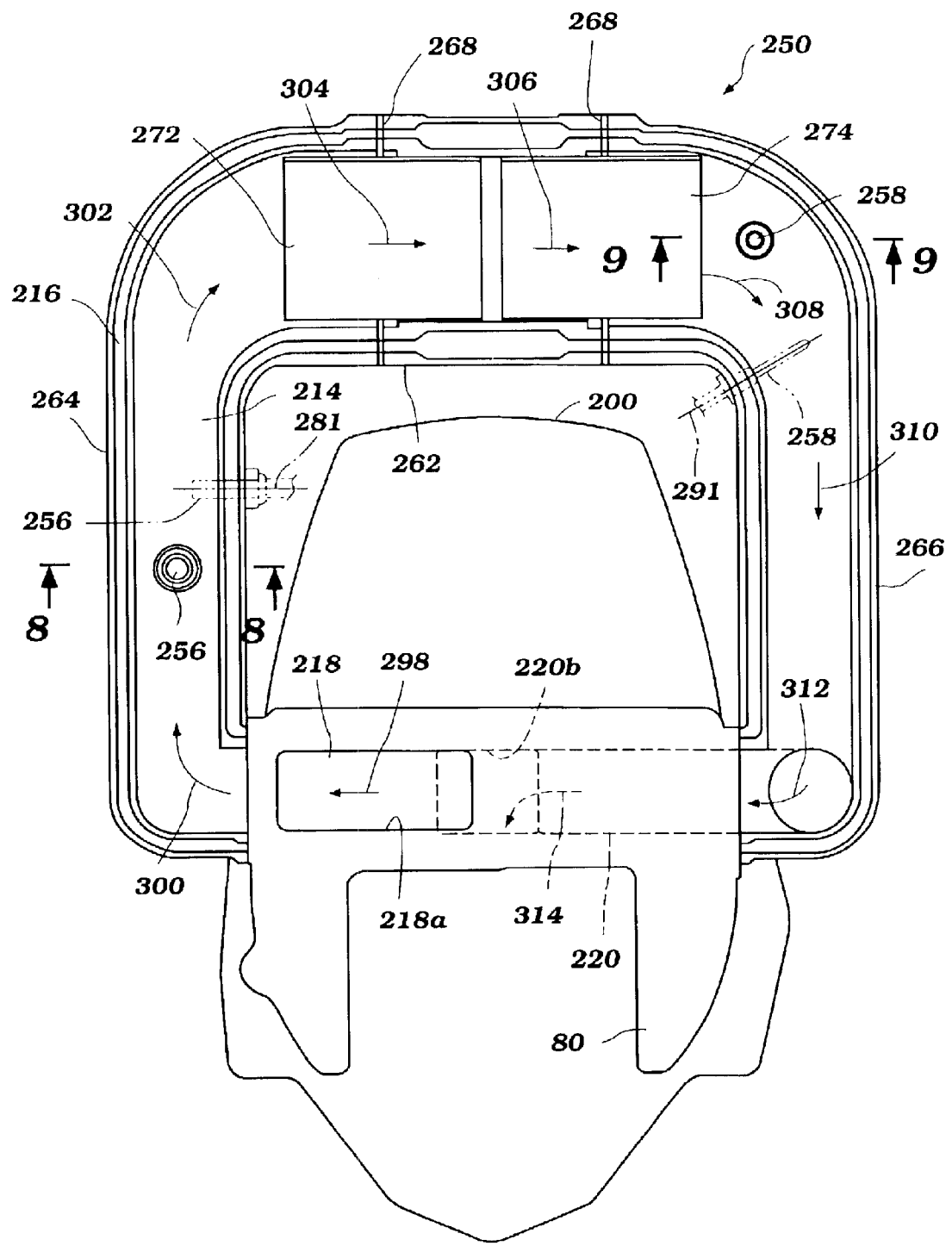
FIG. 7 is a top plan view of the modified outboard motor. A modified exhaust unit is illustrated in section.
Figure 8:
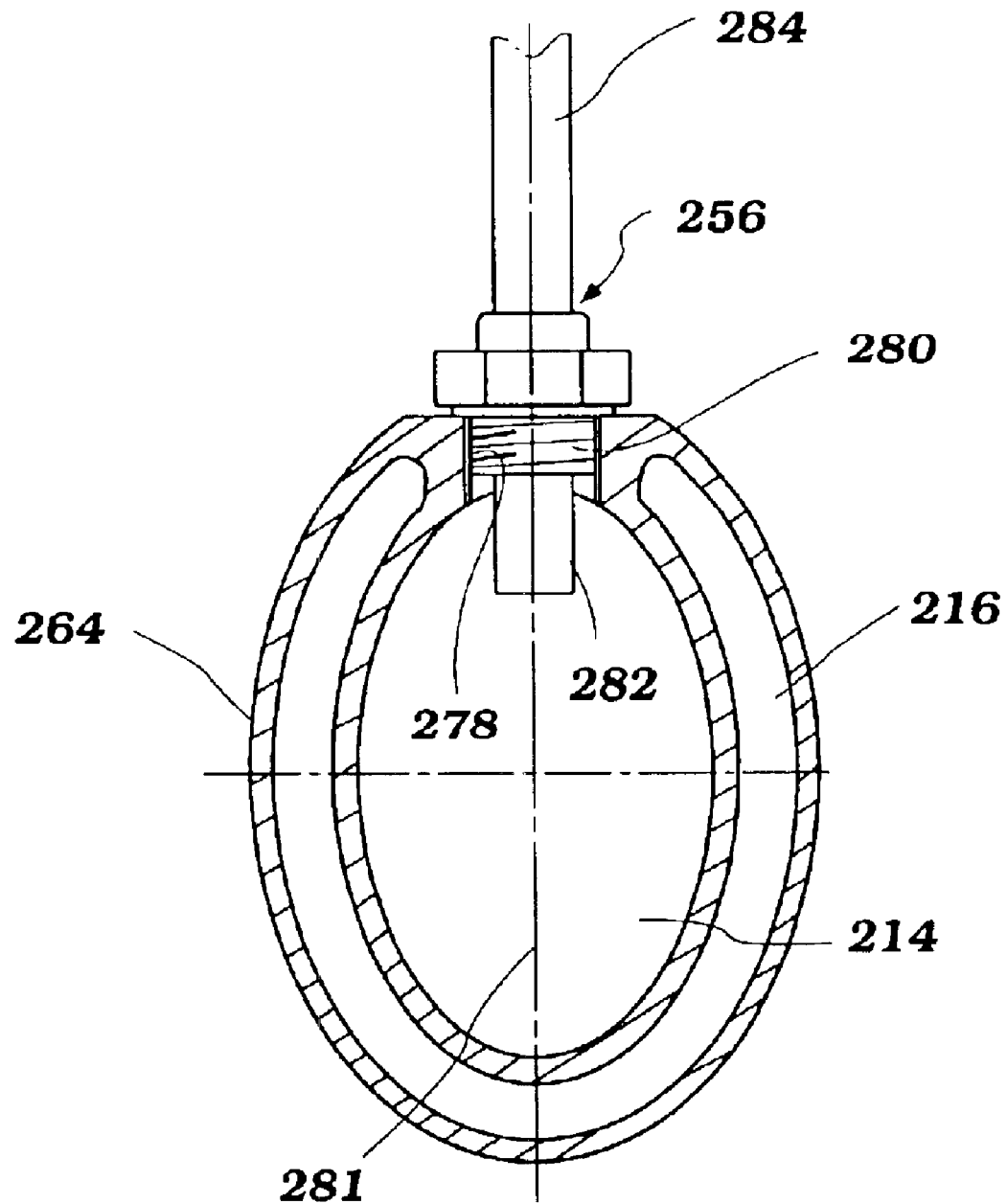
FIG. 8 is a sectional view taken along the line 8—8 of FIG. 7.

With reference to FIG. 7, the exhaust gases in the first exhaust passage 218 of the exhaust guide member 80 go out to the exhaust unit 250 as indicated by the arrow 298 and move to the catalyzers 272, 274 as indicated by the arrows 300, 302 through the extra passage 214 of the side member 264. In this way to the catalyzers 272, 274, the oxygen sensor 256 senses the current amount of oxygen in the exhaust gases. Then, the exhaust gases pass through the catalyzers 272, 274 as indicated by the arrows 304, 306 to be purified thereby and flow to the second exhaust passage 220 of the exhaust guide member 80 as indicated by the arrows 308, 310, 312 through the extra passage 214 of the side member 266. Immediately after exiting the catalyzer 274, the exhaust gas temperature sensor 258 senses the current temperature of the exhaust gases. The exhaust gases in the second passage 220 then flow to the internal passage 173 of the driveshaft housing 60 as indicated by the arrow 314.

Figure 10:
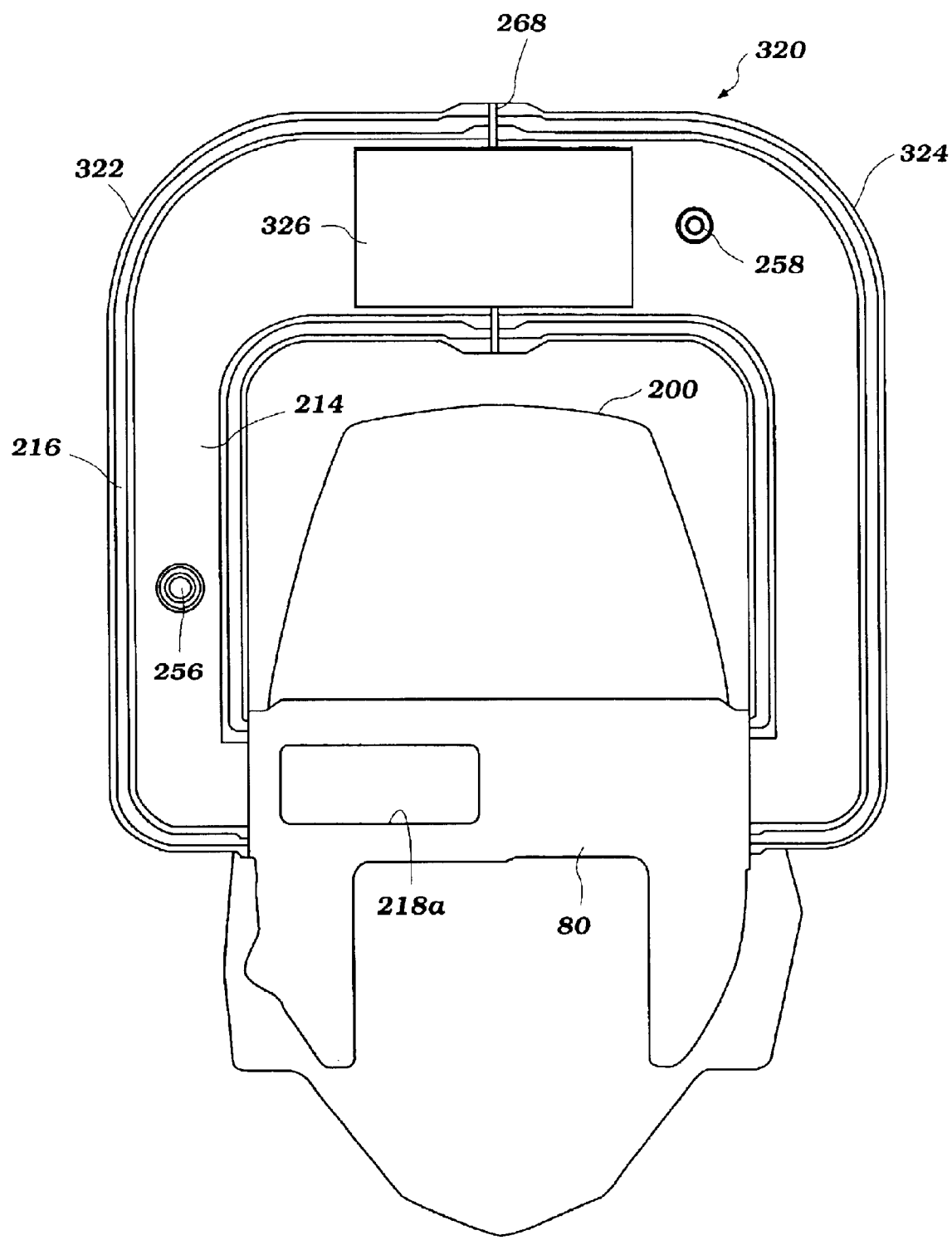
FIG. 10 is a top plan view of a further modification of the outboard motor. A further modified exhaust unit is illustrated in section.

FIG. 10 illustrates a further modified exhaust unit 320. The exhaust unit 320 comprises two side members 322, 324 coupled together without any center member. In this embodiment, the side members 322, 324 together hold a single catalyzer 326. The catalyzer 326 preferably is the same as the catalyzer 272 to contain the three-way catalyst element. However, of course, other catalyzers are available. The other construction of the exhaust unit 320 is generally the same as the exhaust unit 250 of the second embodiment. The same members and components are assigned with the same reference numerals and are not described repeatedly.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An outboard motor comprising an internal combustion engine having a first exhaust passage section, a housing unit adapted to be mounted on an associated watercraft, the housing unit having a second exhaust passage section, a support member mounted on the housing unit to support the engine above the housing unit, the support member defining third and fourth exhaust passage sections, the third exhaust passage section being wholly defined within the support member and communicating with the first exhaust passage section, the fourth exhaust passage section communicating with the second exhaust passage section, an exhaust unit detachably coupled with the support member and defining a fifth exhaust passage section communicating with the third and fourth exhaust passage sections, the exhaust unit, at least in part, positioned generally rearward of the support member, and at least one catalyzer disposed in the fifth exhaust passage section of the exhaust unit.

2. The outboard motor as set forth in claim 1, wherein the fifth exhaust passage section is connected with at least one of the third and fourth exhaust passage sections on a lateral side of the support member.

3. The outboard motor as set forth in claim 2, wherein the fifth exhaust passage section is connected with the third exhaust passage section on one lateral side of the support member, and the fifth exhaust passage section is connected with the fourth exhaust passage section on an opposite lateral side of the support member.

4. The outboard motor as set forth in claim 1, wherein the exhaust unit comprises at least two separable members which are coupled with each other, and at least one of the separable members holds at least a portion of the catalyzer.

5. The outboard motor as set forth in claim 4, wherein the exhaust unit comprises three separable members, and one of the separable members is located between the other two of the separable members and holds at least a portion of the catalyzer.

6. The outboard motor as set forth in claim 4, wherein two of the separable members, which are positioned next to each other, together hold the catalyzer.

7. The outboard motor as set forth in claim 1, wherein the exhaust unit holds at least two catalyzers within the fifth exhaust passage section.

8. The outboard motor as set forth in claim 7, wherein the catalyzers are disposed in series with each other.

9. The outboard motor as set forth in claim 7, wherein each catalyzer comprises a catalyst bed, and the catalyst bed of one of the catalyzers has a different chemical composition than the catalyst bed of the other catalyzer.

10. The outboard motor as set forth in claim 1, wherein the fifth exhaust passage section is positioned generally higher than the fourth exhaust passage section.

11. The outboard motor as set forth in claim 1, wherein the exhaust unit additionally defines a coolant passage extending adjacent to at least a portion of the catalyzer.

12. The outboard motor as set forth in claim 11, wherein the coolant passage generally surrounds the catalyzer.

13. The outboard motor as set forth in claim 1, additionally comprising at least one sensor that senses an exhaust condition, and the sensor being exposed to a portion of the fifth exhaust passage section.

14. The outboard motor as set forth in claim 13, wherein the sensor includes an air/fuel ratio sensor disposed upstream of the catalyzer.

15. The outboard motor as set forth in claim 13, wherein the sensor includes an exhaust gas temperature sensor disposed downstream of the catalyzer.

16. The outboard motor as set forth in claim 13, wherein the sensor has an axis extending generally parallel to an axis of an output shaft of the engine.

17. The outboard motor as set forth in claim 13, wherein the sensor has an axis extending generally normal to an axis of an output shaft of the engine.

18. An outboard motor comprising an internal combustion engine having a first exhaust passage section, a housing unit adapted to be mounted on an associated watercraft, the housing unit having a second exhaust passage section, a support member mounted on the housing unit to support the engine above the housing unit, the support member defining third and fourth exhaust passage sections, the third exhaust passage section being wholly defined within the support member and communicating with the first exhaust passage section, the fourth exhaust passage section communicating with the second exhaust passage section, an exhaust unit detachably coupled with the support member and defining a fifth exhaust passage section communicating with the third and fourth exhaust passage sections, a space defined below a surface of the engine and above a surface of the support member, at least a portion of the fifth exhaust passage section extending through the space, and at least one catalyzer disposed in the fifth exhaust passage section of the exhaust unit.

19. The outboard motor as set forth in claim 18, wherein the catalyzer is configured such that at least a portion of the fifth exhaust passage section has a generally oval cross-sectional shape relative to a flow axis through the fifth exhaust passage section.

20. An outboard motor comprising an internal combustion engine having a first exhaust passage section, a housing unit adapted to be mounted on an associated watercraft, the housing unit having a second exhaust passage section, a support member mounted on the housing unit to support the engine above the housing unit, the support member defining third and fourth exhaust passage sections, the third exhaust passage section being wholly defined within the support member and communicating with the first exhaust passage section, the fourth exhaust passage section communicating with the second exhaust passage section, an exhaust unit detachably coupled with the support member and defining a fifth exhaust passage section communicating with the third and fourth exhaust passage sections, a space defined below a surface of the engine and above a surface of the support member, the fifth exhaust passage section beyond the space, and at least one catalyzer disposed in the fifth exhaust passage section of the exhaust unit.

21. An outboard motor comprising an internal combustion engine having a first exhaust passage section, a housing unit adapted to be mounted on an associated watercraft, the housing unit having a second exhaust passage section, a support member mounted on the housing unit to support the engine above the housing unit, the support member defining third and fourth exhaust passage sections, the third exhaust passage section being wholly defined within the support member and communicating with the first exhaust passage section, the fourth exhaust passage section communicating with the second exhaust passage section, an exhaust unit detachably coupled with the support member and defining a fifth exhaust passage section communicating with the third and fourth exhaust passage sections, the fifth exhaust passage section, at least in part, having a diameter that is greater than either a diameter of the third exhaust passage section or a diameter of the fourth exhaust passage section, and at least one catalyzer disposed in the fifth exhaust passage section of the exhaust unit.

22. The outboard motor as set forth in claim 21, wherein the catalyzer generally has a cylindrical shape.

23. An outboard motor comprising a housing unit, an internal combustion engine disposed above the housing unit, the engine defining an internal exhaust passage, an exhaust guide member positioned between the housing unit and the engine to support the engine, the exhaust guide member defining first and second exhaust passages, the first exhaust passage communicating with the internal exhaust passage, the second exhaust passage communicating with an exhaust discharge passage defined within the housing unit, a generally C-shaped exhaust unit detachably affixed to the exhaust guide member, the exhaust unit being positioned generally rearward of the exhaust guide member, the exhaust unit defining another passage communicating with the first and second exhaust passages, the exhaust unit passage extending generally normal to an axis of an output shaft of the engine, and at least one catalyzer positioned within the exhaust unit passage.

24. The outboard motor as set forth in claim 23, wherein an outlet of the first exhaust passage and an inlet of the second exhaust passage are generally aligned along a transversely extending axis.

25. The outboard motor as set forth in claim 23, wherein at least a portion of an inlet of the first exhaust passage lies directly above an outlet of the second exhaust passage.

26. The outboard motor as set forth in claim 23, wherein a enter of an inlet of the first exhaust passage and a center of an outlet of the second exhaust passage extend generally parallel to the axis of the output shaft of the engine and generally parallel to each other.

27. The outboard motor as set forth in claim 23, wherein the exhaust unit comprises a plurality of conduit members which are coupled together, and at least one of the conduit members holds at least a portion of the catalyzer.

28. The outboard motor as set forth in claim 23, wherein the exhaust unit holds a plurality of catalyzers.

29. The outboard motor as set forth in claim 23, wherein at least a portion of the exhaust unit passage extends below the engine.

30. The outboard motor as set forth in claim 23, wherein a portion of the exhaust unit passage extends generally transversely and generally rearward of the engine.

31. The outboard motor as set forth in claim 30, wherein the catalyzer is disposed within the transversely extending portion of the exhaust unit passage.

32. The outboard motor as set forth in claim 23, wherein a portion of the exhaust unit passage extends generally transversely, the catalyzer is disposed within the transversely extending portion of the exhaust unit passage, and the portion of the exhaust unit passage is positioned generally higher than the second exhaust passage.

33. The outboard motor as set forth in claim 23, wherein the exhaust unit additionally defines a coolant passage extending adjacent to at least a portion of the catalyzer.

34. The outboard motor as set forth in claim 23, additionally comprising at least one sensor to sense an exhaust condition, the sensor being exposed to a portion of the exhaust unit passage.

35. The outboard motor as set forth in claim 4, wherein the separable members are laterally separable.

36. An outboard motor comprising an internal combustion engine having a first exhaust passage section, a housing unit adapted to be mounted on an associated watercraft, the housing unit having a second exhaust passage section, a support member mounted on the housing unit to support the engine above the housing unit, the support member having third and fourth exhaust passage sections, the third exhaust passage section directly communicating with the first exhaust passage section without any intermediate passage, the fourth exhaust passage section communicating with the second exhaust passage section, an exhaust unit detachably coupled with the support member and defining a fifth exhaust passage section communicating with the third and fourth exhaust passage sections, the exhaust unit, at least in part, positioned generally rearward of the support member, and at least one catalyzer disposed in the fifth exhaust passage section of the exhaust unit.

37. An outboard motor comprising a housing unit, an internal combustion engine disposed above the housing unit, the engine having an output shaft that extends generally vertically, the engine defining an internal exhaust passage, an exhaust guide member positioned between the housing unit and the engine to support the engine, the exhaust guide member defining first and second exhaust passages, the first exhaust passage communicating with the internal exhaust passage, the second exhaust passage communicating with an exhaust discharge passage defined within the housing unit, an exhaust unit detachably affixed to the exhaust guide member, the exhaust unit being positioned generally rearward of the exhaust guide member, the exhaust unit defining a third exhaust passage communicating with the first and second exhaust passages, the third exhaust passage extending generally normal to an axis of the output shaft of the engine, a space is defined below a surface of the engine and above a surface of the exhaust guide member, and at least a portion of the third exhaust passage extending through the space, and at least one catalyzer positioned within the third exhaust passage.

* * * * *

UNITED STATES PATENT AND TRADEMARK OFFICE
CERTIFICATE OF CORRECTION

| | | |
|---|---|---|
| PATENT NO. | : 6,884,133 B2 | Page 1 of 1 |
| APPLICATION NO. | : 10/090421 | |
| DATED | : April 26, 2005 | |
| INVENTOR(S) | : Yasushi Ishii | |

It is certified that error appears in the above-identified patent and that said Letters Patent is hereby corrected as shown below:

Title Page; item [57] Abstract; Line 12:
    After "defines", please add --a--

Column 16; Line 52 (Claim 13):
    Please delete "1," and insert therefore, --1--

Column 18; Line 22 (Claim 26):
    Please delete "enter" and insert therefore, --center--

Column 18; Line 50 (Claim 34):
    Please delete "23," and insert therefore, --23--

Signed and Sealed this

Twelfth Day of December, 2006

JON W. DUDAS
*Director of the United States Patent and Trademark Office*